(12) United States Patent
Pik et al.

(10) Patent No.: US 7,716,640 B2
(45) Date of Patent: May 11, 2010

(54) TECHNIQUES FOR DEVELOPING PORTAL SNIPPETS USING AN INTEGRATED DEVELOPMENT ENVIRONMENT (IDE)

(75) Inventors: Yossi Pik, Tel Aviv (IL); Gaia Calabi, Tel Aviv (IL); Ruth Tamari, Ramat-Hasharon (IL); Ofer Feldman, Hertzelia (IL); Tsufit Naor, Kfar-Saba (IL); Ariel Bentolila, Ramat Hasharon (IL)

(73) Assignee: SAP Portals Israel Ltd., Ra'anana (IL)

( * ) Notice: Subject to any disclaimer, the term of this patent is extended or adjusted under 35 U.S.C. 154(b) by 1067 days.

(21) Appl. No.: 10/851,696

(22) Filed: May 21, 2004

(65) Prior Publication Data

US 2005/0262480 A1    Nov. 24, 2005

(51) Int. Cl.
*G06F 9/44* (2006.01)
*G06F 9/45* (2006.01)
(52) U.S. Cl. .................. 717/124; 717/100; 717/140
(58) Field of Classification Search ......... 717/106–109, 717/137, 168–178
See application file for complete search history.

(56) References Cited

U.S. PATENT DOCUMENTS

| | | | |
|---|---|---|---|
| 6,349,343 B1 * | 2/2002 | Foody et al. | 719/316 |
| 6,978,439 B2 * | 12/2005 | Kelley et al. | 717/101 |
| 7,062,750 B2 * | 6/2006 | Whidby et al. | 717/103 |
| 2003/0105883 A1 * | 6/2003 | Gibbons | 709/313 |
| 2003/0131148 A1 * | 7/2003 | Kelley et al. | 709/321 |
| 2003/0237044 A1 | 12/2003 | Hayer et al. | |
| 2004/0002944 A1 | 1/2004 | Hauser et al. | |
| 2004/0003097 A1 | 1/2004 | Willis et al. | |
| 2004/0010598 A1 * | 1/2004 | Bales et al. | 709/228 |
| 2004/0046789 A1 | 3/2004 | Inanoria | |
| 2004/0049776 A1 | 3/2004 | Fomenko et al. | |

(Continued)

FOREIGN PATENT DOCUMENTS

WO    WO 2005/114388 A1    12/2005

(Continued)

OTHER PUBLICATIONS

"Debug Tracer: An XML-driven debugging automation tool for Java", Jan. 29, 2004, IBM downloaded from <http://www.alpahworks.ibm.com/tech/debugtracer>.*

(Continued)

*Primary Examiner*—Jason Mitchell
(74) *Attorney, Agent, or Firm*—Buckley, Maschoff & Talwalkar LLC

(57) ABSTRACT

Techniques for developing applications for various frameworks. An IDE is provided comprising user-selectable options for building applications for a first framework and also for building applications for a portal based upon a second framework different from the first framework. The portal applications for the portal based upon the second framework may be developed using a language supported by the first framework. User-selectable options provided by the IDE also enable deployment of the portal applications to the portal. A single IDE can be used to develop applications for different frameworks. For example, Visual Studio .NET may be used to develop applications for the .NET framework and also to develop and deploy portal applications (e.g., portal snippets) for a portal based upon a Java-based framework such as J2EE. The portal snippets may be developed using a .NET language.

29 Claims, 12 Drawing Sheets

U.S. PATENT DOCUMENTS

| | | | |
|---|---|---|---|
| 2004/0268301 A1* | 12/2004 | Kaston | 717/108 |
| 2005/0071824 A1* | 3/2005 | K. N. et al. | 717/138 |
| 2005/0257193 A1* | 11/2005 | Falk et al. | 717/109 |
| 2006/0206856 A1* | 9/2006 | Breeden et al. | 717/101 |

FOREIGN PATENT DOCUMENTS

| | | | |
|---|---|---|---|
| WO | WO 2005/114389 A1 | 12/2005 | |

OTHER PUBLICATIONS

U.S. Appl. No. 10/853,024, filed May 21, 2004, Pik et al.
U.S. Appl. No. 10/851,462, filed May 21, 2004, Pik et al.
U.S. Appl. No. 10/851,469, filed May 21, 2004, Feldman.
"Achieving Interoperability: ILOG JRules, .Net and JNBridgePro," pp. 1-9.
"ASP.NET, Demonstrating Attributes and Reflection in .NET," contributed by Wrox Team, pp. 1-22 downloaded from http://www.devarticles.com/index2.php?option=content&task=view&id=362&pop=l&hi... on Nov. 17, 2004.
Cherng et al., "Contact First Web Services Interoperability between Microsoft .NET and IBM WebSphere," pp. 1-27 downloaded from http://msdn.microsoft.com/vstudio/java/interop/websphereinterop/default.aspx?print=true on Jan. 20, 2006.
Guest, S., "Web Services Interoperability Guidance (WSIG): IBM WebSphere Application Developer 5.1.2," pp. 1-16 downloaded from http://msdn.microsoft.com/vstudio/java/interop/strategies/default.aspx?pull=/library on Jan. 20, 2006.
Guest, S., "Web Services Interoperability Guidance (WSIG): BEA WebLogic 8.1 SP3 (8.1.3)," pp. 1-10 downloaded from http://msdn.microsoft.com/vstudio/java/interop/strategies/default.aspx?pull=/library/en-us/.. on Jan. 20, 2006.
Herman, M., "Microsoft SharePoint Products and Technologies: Technical Overview," pp. 1-12 downloaded from http://www.microsoft.com/technet/prodtechnol/office/sps2003/plan/spst23to.mspx?pf=true on Nov. 23, 2004, updated Aug. 19, 2003.
"Implementing Rich Collaboration Infrastructure Using Microsoft Windows SharePoint Services and Microsoft Office SharePoint Portal Server 2003," White Paper (2003).
International Search Report and Written Opinion for PCT application # PCT/EP2005/003530, Aug. 11, 2005.
International Search Report and Written Opinion for corresponding PCT application # PCT/EP2005/003528, Jul. 11, 2005.
"Interoperability between Java and Microsoft, Understanding the problems and solutions when integrating heterogeneous distributed computing environments," Whitepaper by Intrinsyc Software, pp. 1-14 (2005).
Intrinsyc Software Product Brochures and other materials downloaded from http:www.intrinsyc.com on Jan. 20, 2006.
"Introducing Visual Studio," web pages downloaded from http://msdn2.microsoft.com/library(d=printer)/fx6bklf4.aspx on Jan. 20, 2006.
"Java/.NET Interoperability: A detailed Comparison of Options," A JNBridge White Paper, pp. 1-7 downloaded from http://www.jnbridge.com/cgi-bin/downloads.pl?itemID=4&view=2 on Oct. 18, 2005, paper date Apr. 5, 2004.
"JNBridgePro™: A Technical Overview," White Paper, pp. 1-6 (2002-2005).
Preradovic, M., "Whitepaper: Microsoft .NET to J2EE Interoperability Performance Analysis," pp. 1-12 (2005).
"SAP Exchange Infrastructure: Process-centric collaboration," SAP White Paper, version 1.2, pp. 1-36 downloaded from http://www.isaca.be/Presentations/RT020928%0Exchange_White.pdf on Oct. 18, 2005, (2002).
"SAP Netweaver Platform Interoperability with IBM Websphere and Microsoft.Net," SAP White Paper, pp. 1-16 downloaded from http://www.sap.com/solutions/netweaver/pdf/BWP_Interoperability.pdf on Oct. 18, 2005, (2003).
"SAP® Enterprise Portal, Portal Infrastructure," pp. 1-16 (2003).
"SAP® Enterprise Portal—Portal Content," pp. 1-22 (2003).
"SharePoint Portal Server Deployment Resources," pp. 1-5 downloaded from http://office.microsoft.com/en-us/FX011442341033.aspx on Nov. 23, 2004.
"SharePoint Portal Server 2003 Product," pp. 1-2 downloaded from http://office.microsoft.com/office/sharepoint/prodinfo/default.mspx on Nov. 23, 2004.
"SharePoint Portal Server," pp. 1-2 downloaded from http://office.microsoft.com/en-us/FX010909721033.aspx on Nov. 23, 2004.
"Strategies for Interoperability," pp. 1-3 downloaded from http://msdn.microsoft.com/vstudio/java/interop/strategies/default.aspx on Jan. 20, 2006.
"Technical Note: JNBridgePro and Clustering," pp. 1-4 (2004).
Watts, M., "Solving the Enterprise Application Integration Challenge," brochure by Intrinsyc Software (2004).

* cited by examiner

TECHNIQUES FOR DEVELOPING PORTAL SNIPPETS USING AN INTEGRATED DEVELOPMENT ENVIRONMENT (IDE)

CROSS-REFERENCES TO RELATED APPLICATIONS

The present application incorporates herein by reference for all purposes the entire contents of the following applications:

(1) U.S. Non-Provisional patent application Ser. No. 10/853,0244 (pending) entitled "PORTAL RUNTIME FRAMEWORK" filed concurrently with the present application;

(2) U.S. Non-Provisional patent application Ser. No. 10/851,462 (pending) entitled "DISPLAYING PORTALS INFORMATION" filed concurrently with the present application; and (3) U.S. Non-Provisional patent application Ser. No. 10/851,469 (pending) entitled "TECHNIQUES FOR ACCESSING PORTAL COMPONENTS" filed concurrently with the present application.

BACKGROUND OF THE INVENTION

The present invention relates to tools for developing applications for different frameworks, and more specifically to techniques that enable a developer to use an integrated development environment to build and deploy portal applications for different frameworks.

Various computing frameworks or platforms have evolved over the years in the computer industry. Examples of such computing frameworks include the .NET computing framework (.NET platform) from Microsoft Corporation, Java-based frameworks such as the Java 2 Platform, Enterprise Edition (J2EE) framework from Sun Microsystems, Inc., and others. Each framework can be considered a group (sometime called a "stack") of common services that each framework provides to applications that are built with or run on the framework.

The .NET framework is a framework provided by Microsoft for programming support for web services that provide a user the ability to use the Web rather than the user's computer for various services. The .NET framework provides users with a Web-enabled interface for applications and computing devices and makes computing activities increasingly Web browser-oriented. The .NET framework includes servers; building-block services, such as Web-based data storage, and device software. The .NET framework also enables developers to create reusable modules that can be used in the .NET framework. Common Language Runtime (CLR) provides a foundation for building applications and components for the .NET framework.

The J2EE framework is a Java-based application server framework from Sun Microsystems, Inc. for the development of distributed applications. The J2EE framework is designed for simplifying application development in a multi-tiered environment by enabling users to create standardized, reusable modular components. The J2EE framework includes many components of the Java 2 Framework, Standard Edition (J2SE) framework. The J2EE framework consists of a set of services, application programming interfaces (APIs), and protocols that provide the functionality for developing multi-tiered, Web-based applications.

Each framework generally supports its own set of programming languages, design environments, programming conventions, programming methodologies, programming APIs, messaging services, security services, etc. that may be used to build applications for the specific framework. For example, the Java language is used to build applications for the J2EE framework. A Java Development Kit (JDK) is provided for building applications for the J2EE framework. Languages that can be used to build applications for the .NET framework include the C++ programming language, the C# programming language, VISUAL BASIC language, JScript, etc (referred to as the ".NET languages").

The runtime environment that is needed to support and execute applications written for a particular framework also differs from the runtime environment for other frameworks. For example, a Java stack or Java Virtual Machine (JVM) running on a UNIX machine is generally needed for running applications that are built for a Java-based framework such as the J2EE framework. An Internet Information Services (IIS) Server running on a Microsoft Windows machine and CLR compilers are generally needed for running applications developed for the .NET framework.

Due to the differences in programming languages and runtime environments associated with various disparate frameworks, the design environments that are used for designing applications for the various frameworks are also different. Examples of applications and IDEs that may be used for designing applications for the Java platform include the JDK, Eclipse provided by IBM, and others. A popular IDE that is used for building applications for the .NET framework is Visual Studio .NET IDE from Microsoft Corporation.

Due to the differences in the frameworks, when an application designer desires to design applications for a particular framework (e.g., .NET framework), the designer has to select a particular language that is supported by the particular framework and also select a particular IDE that is configured for building applications for the particular framework. Since each IDE has its own specific user-selectable options (e.g., protocols, commands, APIs, menus, etc.) for designing applications, the designer has to learn the user-selectable options of the selected IDE. Now, if the designer wants to develop an application for another framework (e.g., Java-based framework), the designer has select another language that is supported by the second framework and another IDE that is configured to facilitate development of applications for the second framework.

Accordingly, if a designer wishes to build applications for separate framework, the designer is often forced to learn programming languages for each of the frameworks and also learn to use an IDE for each framework. This process of learning multiple languages and use of multiple IDEs reduces the effectiveness and efficiency of the designer in designing applications. As a result, application designers for a particular framework tend not to develop applications for some other framework.

As a specific example, enterprise portal products developed by SAP AG are built based upon a Java framework such as the J2EE framework. Consequently, applications (e.g., SAP iViews) that are developed for a SAP portal are built using Java and using a Java-based IDE such as the JDK or the ECLIPSE development environments. However, this is a major impediment for .NET developers who wish to write application components for SAP portals as the .NET developers are used to building applications using a .NET language and a .NET IDE.

In light of the above, techniques are desired that simplify the process of designing applications for different frameworks.

BRIEF SUMMARY OF THE INVENTION

Embodiments of the present invention provide techniques for developing/designing applications for various frameworks. An IDE is provided comprising user-selectable options for building applications for a first framework and also for building applications for a portal based upon a second framework different from the first framework. The portal applications for the portal based upon the second framework may be developed using a language supported by the first framework. User-selectable options provided by the IDE also enable deployment of the portal applications to the portal. As a result, a single IDE can be used to develop applications for different frameworks. The user may be a programmer or developer, a designer, or any other user of the IDE.

According to an embodiment of the present invention, techniques are provided for enabling development of portal snippets using an integrated development environment (IDE), the IDE comprising user-selectable options for developing an application for a first framework. The IDE provides a first set of user-selectable options for developing a portal snippet for a portal based upon a second framework different from the first framework. The IDE also provides a second set of user-selectable options for deploying the portal snippet to the portal.

According to another embodiment of the present invention, techniques are provided for developing a portal snippet using an integrated development environment (IDE) executing on a computer system, the IDE comprising a plurality user-selectable options, the plurality of user-selectable options including a set of user-selectable options for developing an application for a first framework. A portal snippet is developed for a portal using at least one user-selectable option from the plurality of user-selectable options, wherein the portal is configured to operate based upon a second framework different from the first framework. The portal snippet is deployed to the portal using at least one user-selectable option from the plurality of user-selectable options.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

An integrated development environment (IDE) is a set of integrated tools for developing software. The tools generally run from a user interface and may comprise a compiler, an editor, a debugger, among others. An IDE may be a standalone application or may be included as part of one or more existing and compatible applications. An example of an IDE is Visual Studio .NET from Microsoft Corporation Embodiments of the present invention provide techniques for developing applications for various frameworks. An IDE is provided that can be used to develop applications for different frameworks. An IDE configured according to the teachings of the present invention comprises user-selectable options for building applications for a first framework (e.g., the .NET framework) and also for building applications for a portal based upon a second framework (e.g., Java) different from the first framework. The user-selectable options may include menus, commands, application programming interfaces (APIs), etc. The portal applications for the portal based upon the second framework may be developed using a language supported by the first framework. User-selectable options provided by the IDE also enable deployment of the portal applications to the portal. As a result, a single IDE can be used to develop applications for different frameworks. The user may be a programmer or developer, a designer, or any other user of the IDE.

For example, according to an embodiment of the present invention, a .NET IDE such as Visual Studio .NET may be used to develop applications for the .NET framework. The capabilities of the .NET IDE are extended by providing user-selectable options that enable development of portal applications (e.g., portal snippets) that can use services provided by a portal based upon a Java-based framework (e.g., J2EE). For example, a user or designer can use a Visual Studio .NET IDE configured according to the teachings of the present invention to develop iViews (or portal snippets in general) that can be executed by a J2EE-based SAP enterprise portal. The portal snippets may be developed using a .NET language. In this manner, .NET developers may use an IDE configured according to the teachings of the present invention to develop not only .NET applications but also to develop portal snippets (e.g., SAP iViews) for a Java-based portal such as a SAP AG enterprise portal. This enables .NET developers to develop content for Java-based portals. Portal applications may also be deployed to the appropriate portals using user-selectable options provided by the IDE. Embodiments of the present invention thus facilitate creation and deployment of portal snippets to portals.

Figure 1:
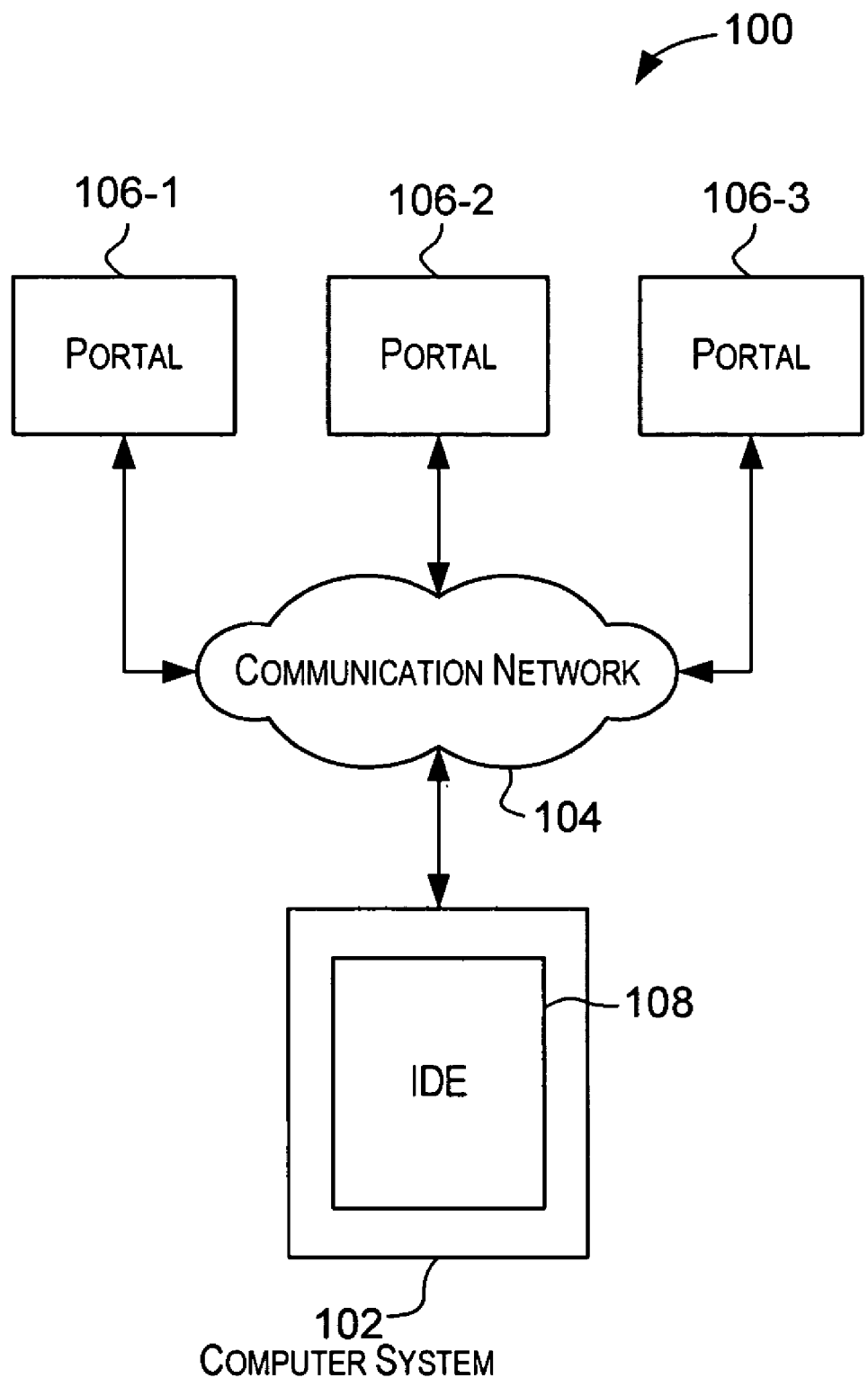
FIG. 1 is a simplified block diagram of a distributed network that may incorporate an embodiment of the present invention.

FIG. 1 is a simplified block diagram of a distributed network 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, a computer system 102 is coupled to one or more portals 106-1, 106-2, and 106-3 via communication network 104. Communication network 104 may be a local area network (LAN), a wide area network (WAN), a wireless network, an Intranet, the Internet, a private network, a public network, a switched network, or any other suitable communication network. Communication network 104 may comprise many interconnected computer systems and communication links such as hardwire links, optical links, satellite or other wireless communications links, wave propagation links, or any other mechanisms for communication of information. Various communication protocols may be used to facilitate communication of information via communication network 104, including TCP/IP, HTTP protocols, extensible markup language (XML), wireless application protocol (WAP), protocols under development by industry standard organizations, vendor-specific protocols, customized protocols, and others.

Portals 106 are configured to provide portal services. A portal provides a central gateway through which users can access various information sources and services/applications. The information sources may include various applications (either internal or external to the portals), documents, sources from the Web, various databases, etc. The portals may be configured to execute on different frameworks such as Java-based frameworks (e.g., the J2EE framework), .NET framework, and others.

A portal may include several components including one or more portal pages, portal snippets, etc. A portal page may comprise one or more portal snippets that enable data to be retrieved and displayed on the portal page. Portal snippets are generally programs that retrieve data from an information resource and display it on a portal page. Accordingly, a portal snippet is a mechanism for displaying content on a portal page. Examples of portal snippets include portlets, SAP's iViews, Plumtree's gadgets, Microsoft's web parts, etc. Portals generally allow a user to select and customize portal snippets that are included in the user's portal page or pages. In this manner, the user can customize the content that is retrieved and displayed on the user's portal page.

Two characteristics are generally associated with a portal snippet: the content retrieved by the portal snippet and the manner in which the content is displayed on a portal page. With respect to the content that is retrieved, a portal snippet can be considered as an information query (or multiple queries) having one or more input parameters that is executed to retrieve information from one or more information sources. The parameters to the query and their values may be set by the portal administrator, the portal snippet designer, the user, or may be set by default. With respect to the presentation aspect, each portal snippet is typically allocated a location on a page or screen where the retrieved information is to be displayed.

When a user logs into a portal and views a portal page comprising a portal snippet, the portal snippet is automatically invoked. As a result of the invocation, the one or more parameterized queries corresponding to the portal snippet are executed to obtain the relevant information from one or more information resources. Examples of queries include a query accessing stock information, a query accessing weather information, a query to access company news, query to access a particular set of documents, etc. The retrieved information is then displayed on the section of the page allocated to the portal snippet.

Computer system 102 may be a personal computer (PC), a PDA, a mobile phone, or any other computing device or data processing system. According to the teachings of the present invention, computer system 102 is configured to execute an IDE 108 configured according to the teachings of the present invention. According to an embodiment of the present invention, computer system 102 executes an IDE that is configured to facilitate development of applications for multiple applications. For example, according to an embodiment of the present invention, computer system 102 may execute a Visual Studio .NET IDE that enables development of applications for .NET framework and also enables development and deployment of portal snippets for Java-based portals such as a SAP enterprise portal. According to the teachings of the present invention, IDE 108 is configured to provide user-selectable options (interfaces, commands, APIs, menus, etc.) that also enable development of applications for the different frameworks.

According to an embodiment of the present invention, IDE 108 comprises user-selectable options that enable portal snippets to be developed for a Java framework-based portal using a programming language supported by the .NET framework. For example, .NET languages such as C#, VB.NET, J#, C++, ASP.NET, etc. may be used to develop portal snippets for Java-based portals. Further details related to the user-selectable options provided by IDE 108 are described below.

Software modules (e.g., software code, instructions) executed by computer system 102 and/or hardware modules of computer system 102 may provide the IDE functionality according to the teachings of the present invention. It should be apparent that in a distributed environment IDE 108 may also be executed by a plurality of computers and the interfaces of the IDE may be displayed on computer system 102. In a distributed environment, the software and/or hardware modules may be distributed among several computers coupled to computer system 102.

Figure 2:
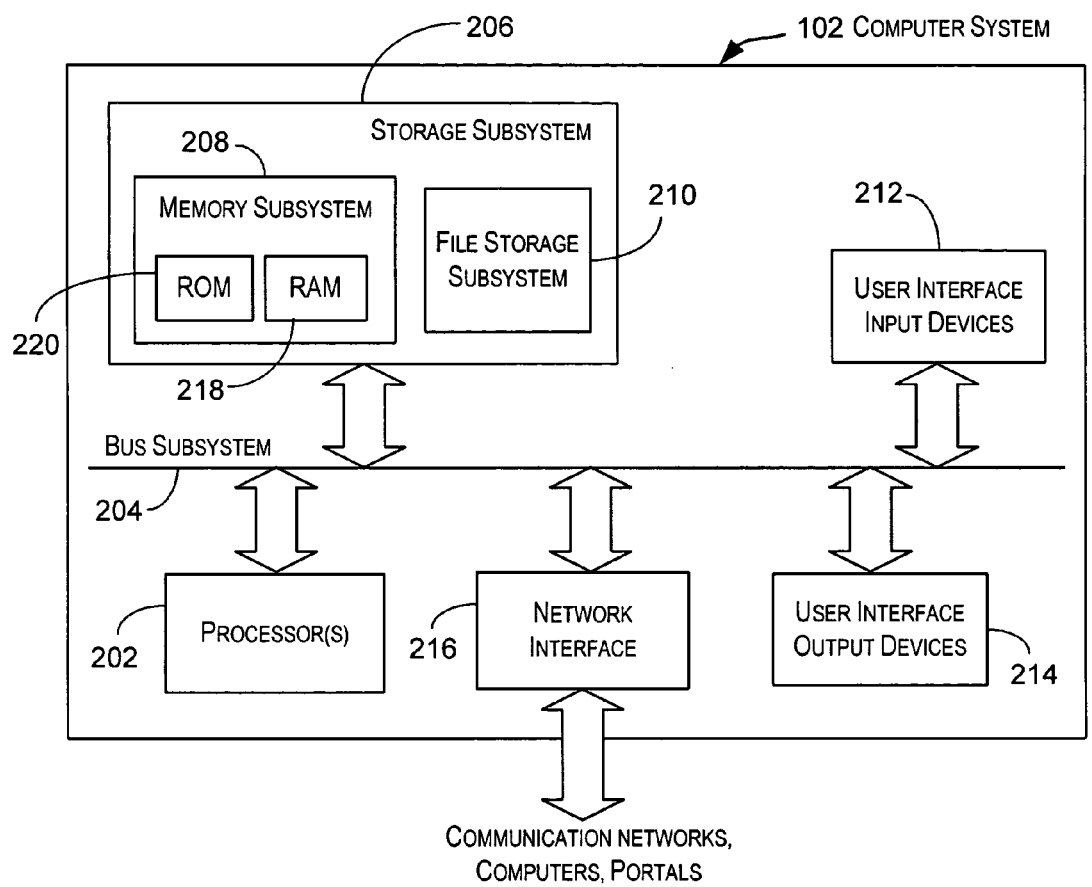
FIG. 2 is a simplified block diagram of a computer system that may execute an IDE according to an embodiment of the present invention.

FIG. 2 is a simplified block diagram of a computer system 102 that may execute an IDE according to an embodiment of the present invention. As shown in FIG. 2, computer system 102 includes a processor 202 that communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216.

Bus subsystem 204 provides a mechanism for letting the various components and subsystems of computer system 102 communicate with each other as intended. Although bus subsystem 204 is shown schematically as a single bus, alternative embodiments of the bus subsystem may utilize multiple busses.

Network interface subsystem 216 provides an interface to other computer systems including portals 106 and other networks. Network interface subsystem 216 serves as an interface for receiving data from other sources and for transmitting data to other sources from computer system 102. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 102. A user may user input devices 212 to interact with IDE 108.

User interface output devices 214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 102. User interfaces of IDE 108 may be displayed by one or more devices of user interface output devices 214.

Storage subsystem 206 may be configured to store the basic programming and data constructs that provide the functionality of the present invention. For example, according to an embodiment of the present invention, software code modules of IDE 108 may be stored in storage subsystem 206. These software modules may be executed by processor(s) 202. Information related to applications (e.g., portal snippets) developed using IDE 108 may also be stored by storage subsystem 206. Storage subsystem 206 may also provide a repository for storing data used in accordance with the present invention. For example, information related to the various portals may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 120 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 102 can be of various types including a personal computer, a portable computer, a workstation, a network computer, a mainframe, a kiosk, or any other data processing system. Due to the ever-changing nature of computers and networks, the description of computer system 102 depicted in FIG. 2 is intended only as a specific example for purposes of illustrating an embodiment of the computer system. Many other configurations having more or fewer components than the system depicted in FIG. 2 are possible.

Figure 3:
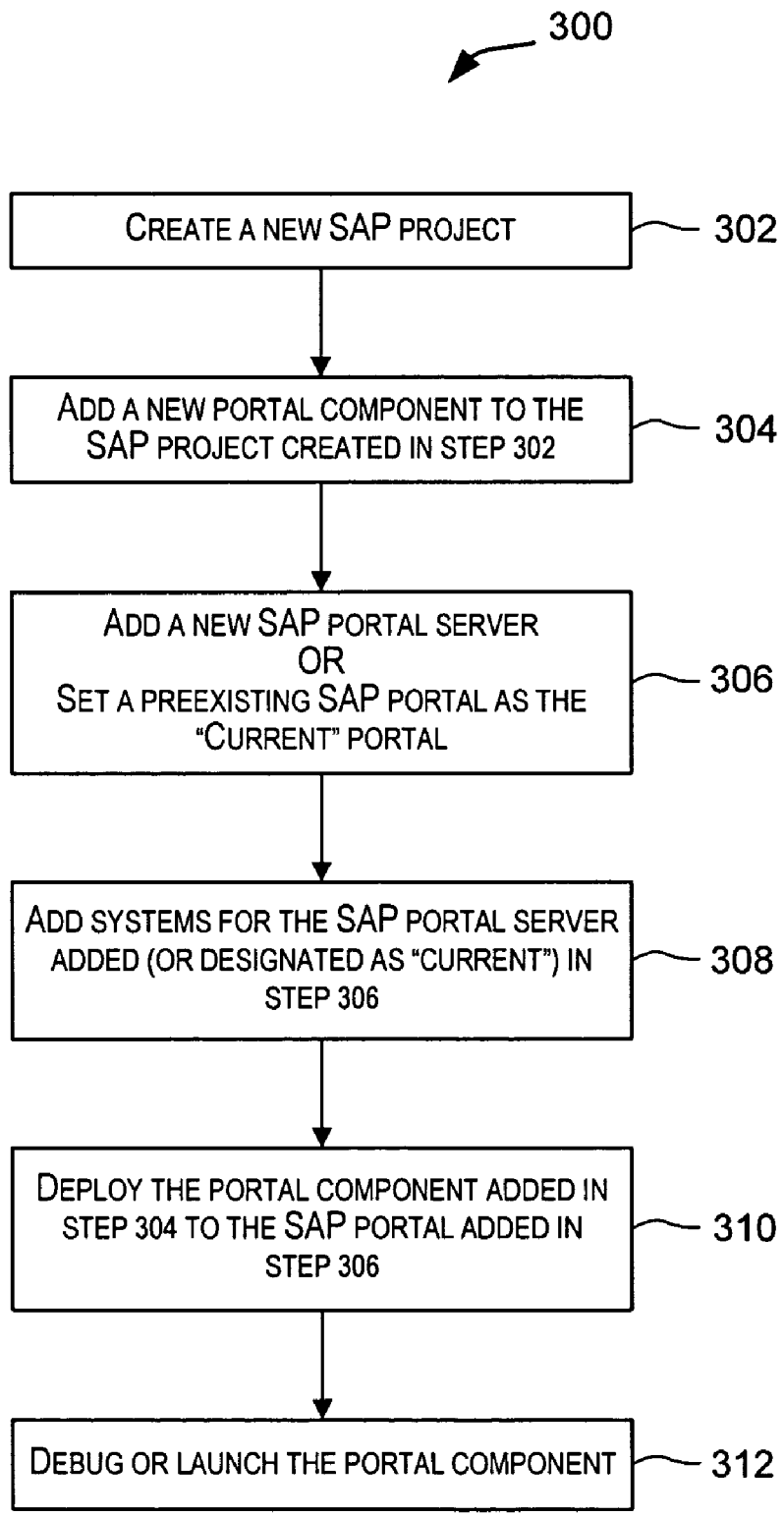
FIG. 3 is a simplified high-level flowchart depicting a series of stages/steps for developing and deploying a portal snippet for a portal according to an embodiment of the present invention.

As stated above, according to the teachings of the present invention, an IDE is provided that comprises user-selectable options that facilitate development and deployment of portal snippets. According to an embodiment of the present invention, the development and deployment of a portal snippet using an IDE may be broken down into several stages. FIG. 3 is a simplified high-level flowchart 300 depicting a series of stages/steps for developing and deploying a portal snippet for a portal according to an embodiment of the present invention. The steps depicted in FIG. 3 are for developing and deploying a portal snippet for a SAP portal. Flowchart 300 depicted in FIG. 3 is merely an example of steps for developing and deploying a portal snippet and is not intended to limit the scope of the present invention. Other variations, modifications, and alternatives are also within the scope of the present invention.

According to an embodiment of the present invention, the steps depicted in FIG. 3 may be performed using user-selectable options provided by an IDE that facilitates development of applications for a first framework and also enables development of portal snippet for portals based upon a second framework different from the first framework. For example, the IDE may be Visual Studio .NET from Microsoft Corporation and may provide user-selectable options for developing applications for the .NET framework. According to the teachings of the present invention, the functionality of the IDE is extended to enable users to develop and deploy portal snippets for a Java framework-based portal such as the SAP enterprise portal. The various steps shown in FIG. 3 and described below may be performed using user-selectable options (e.g., user interfaces, commands, menus, APIs, etc.) provided by the IDE.

FIG. 3 assumes that a portal snippet is being developed for a Java-based SAP portal using an IDE such as Visual Studio .NET. However, the scope of the present invention as recited in the claims is not restricted to the SAP portal or to Visual Studio .NET.

As depicted in FIG. 3, the process may be initiated by creating a new SAP project (step 302). The user may then add a portal component to the SAP project created in step 302 (step 304). According to an embodiment of the present invention, the portal component is a portal snippet that can use the services of a Java framework based portal such as the SAP portal.

According to an embodiment of the present invention, the services provided by the Java framework-based portal (that are implemented in Java language) are exposed through a .NET type API. For examples, in one embodiment, .NET compatible API wrappers are provided for the Java language APIs. As a result, as part of step 304, the user may program the portal snippet for a Java-based portal using a .NET programming language such as the C# programming language, the VB.NET programming language, etc using .NET APIs. This enables .NET programmers who are not well-versed with Java programming to be able to develop content and applications for Java-framework-based portals.

The user may then add a SAP portal server to which the portal snippet developed in step 304 is to be deployed (step 306). Alternatively, if one or more portals have already been added to the IDE, as part of step 306, the user may select a particular portal for deployment. In one embodiment, this may be done by selecting the portal and marking/designating the selection as the "current" portal.

The user may then add one or more systems for the portal server added in step 306 (step 308). One or more systems may be defined for the portal added in step 306. The information of systems may be used to easily connect to the portal server. The portal systems may correspond to data sources such as a SQL server, R/3 servers, third party applications, etc. In 308, setting for a particular data source may be specified; the settings may be used later to connect to that data source. For a particular portal, information may be retrieved for all systems defined for the portal.

The portal snippet developed in step 304 may then be deployed to the portal added or selected in step 306 (step 310). Deployment of a portal snippet to a portal includes preparing an archive of files related to the portal snippet and communicating the archive to the portal for subsequent use at the portal. The deployed portal snippet is generally stored in a repository in the portal.

The user may debug and/or launch the portal component using the IDE (step 312). For example, after an iView is deployed, the user may use the IDE to debug the iView code. According to an embodiment of the present invention, standard debugging techniques that are used in the .NET development environment may also be used to debug portal components written for frameworks (e.g., Java) other than the .NET framework. For example, iViews developed for SAP Java-based portals may be debugged using standard .NET debugging techniques.

A user may also launch a developed iView from the IDE and preview it without needing to launch the whole portal using the default parameters and under the context of the user that was entered in for the portal server instance (in the server explorer).

Figure 4:
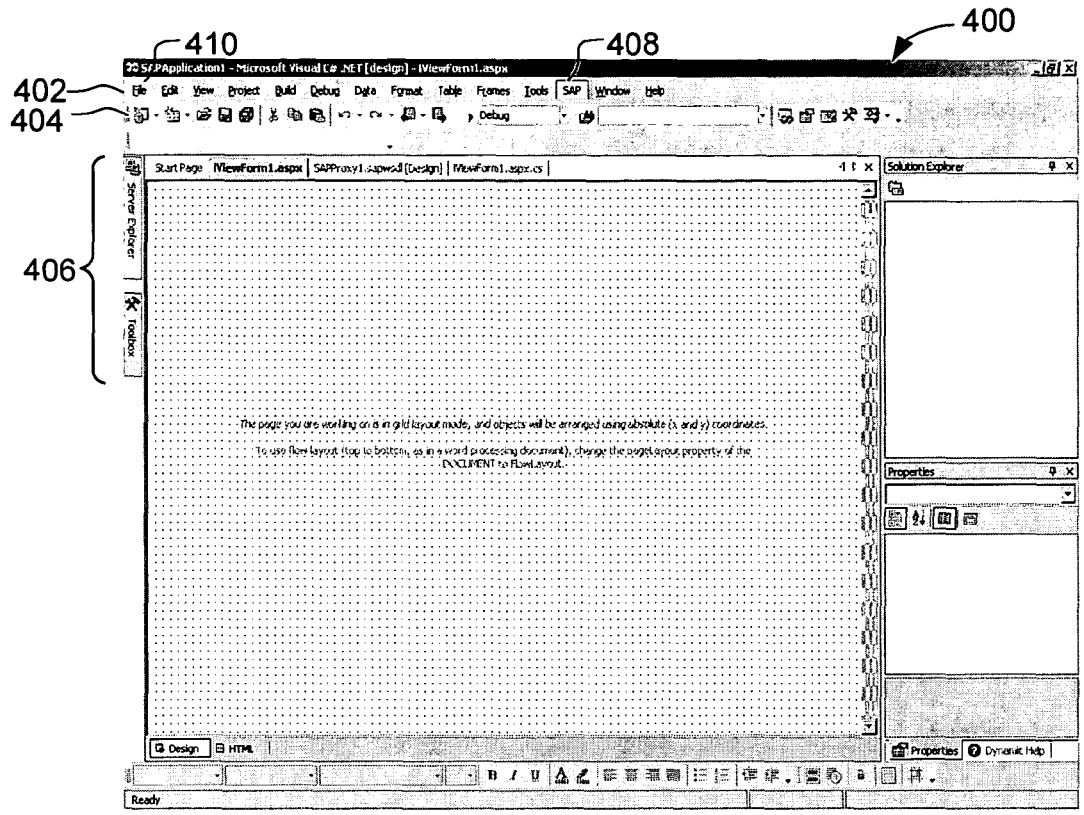
FIG. 4 depicts a graphical user interface of an IDE configured according to an embodiment of the present invention.

As described above, according to the teachings of the present invention, an IDE is configured to provide user-selectable options that can be used to develop applications for a first framework (e.g., .NET) and to develop and deploy portal snippets for a portal based upon a second framework (e.g., J2EE) for execution. FIG. 4 depicts a graphical user interface 400 of an IDE configured according to an embodiment of the present invention. The embodiment graphical user interface depicted in FIG. 4 is from Visual Studio .NET. As shown, graphical user interface 400 comprises multiple user-selectable options such as menus 402, toolbar of icons 404, tabs 406, etc. The various user-selectable options comprise options that enable a user to develop applications for a .NET framework. According to the teachings of the present invention, the various user-selectable options also comprise a set of options that enable a user to develop and deploy portal snippets for a portal executing according to a Java-based framework such as J2EE. The portal snippets may be developed using a language from a set of languages supported by the .NET framework such as the VB.NET programming language, the C# programming language, the J# programming language, etc. In this manner, a portal snippet for a Java-based framework may be developed using a .NET language and using an IDE that was previously configured to develop .NET applications.

According to an embodiment of the present invention, the set of options include options for creating and deploying iViews for a SAP AG enterprise portal. As depicted in FIG. 4, the IDE has been extended by adding a SAP-specific drop down menu "SAP" 408. SAP menu 408 comprises several user-selectable options for creating and deploying SAP iViews. A SAP-specific toolbar of icons may also be provided. According to an embodiment of the present invention, the SAP-specific menus, toolbars, etc., are contextual and are activated only when the active project is a SAP project.

While the following describes features of the present invention using SAP portal snippets (i.e., SAP iViews), the scope of the present invention as recited in the claims is however not restricted to SAP iViews. In alternative embodiments, other non-SAP portal snippets may also be developed and deployed according to the teachings of the present invention.

Figure 5:
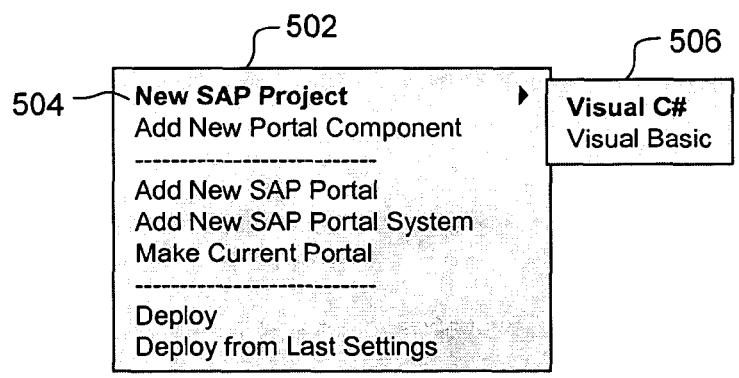
FIG. 5 depicts a menu that is invoked upon selecting a SAP menu option according to an embodiment of the present invention.

As previously described with respect to FIG. 3, the task of developing a portal snippet generally staffs out with creating a SAP projects. A SAP project enables a .NET developer to create content for a SAP portal and deploy the content to the portal. Graphical user interface 400 provides various user-selectable options for creating a SAP project. According to one technique, a new SAP project may be created by selecting SAP menu 408 which invokes a menu 502 as depicted in FIG. 5. Menu 502 comprises several user-selectable options including a "New SAP Project" option 504 which the user may select to create a new project. Upon selection of "New SAP project" option 504, a sub-menu 506 is displayed showing a set of .NET languages for programming the portal snippet. As shown in FIG. 5, the user can select from either the VISUAL C# programming langue or VISUAL BASIC programming language. Other languages may be provided in alternative embodiments.

Figure 6:
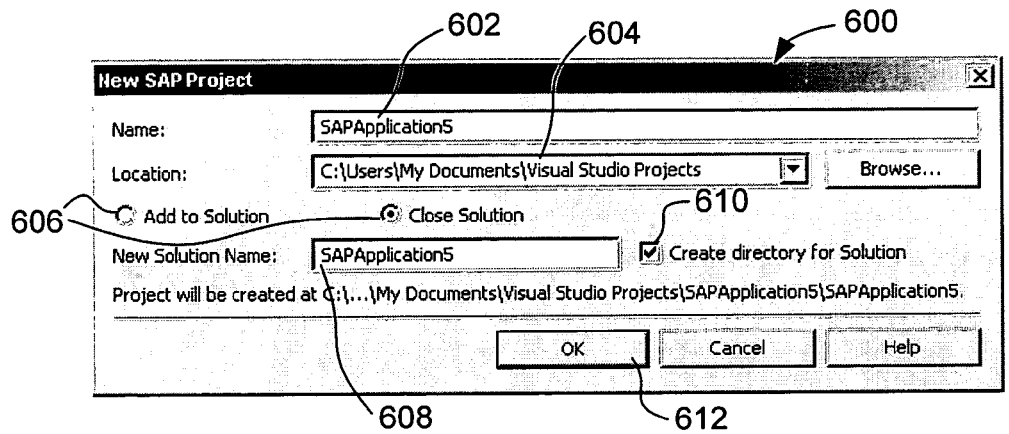
FIG. 6 depicts a graphical user interface that enables a user to specify various properties of a SAP project according to an embodiment of the present invention.

Upon selecting the desired language from menu 506, a graphical user interface 600, as depicted in FIG. 6, is displayed. Graphical user interface 600 enables the user to specify various properties of the SAP project being created. The user may specify: the name of the project (in field 602), the storage location where the project-related information is to be stored (in field 604), whether the project is to be added to a solution or is a closed solution (using radio buttons 606), whether or not to create a directory for the solution (using check box 610). As described below, files for the project from the storage location specified in field 604 are used for creating a portal archive (PAR) for deployment. After the user has specified the requisite information, a new SAP project is created upon selecting "OK" button 612. According to an embodiment of the present invention, the information provided via interface 600 is similar to the information that is used for creating an ASP.NET web application.

According to an embodiment of the present invention, an SAP project comprises web resources (shown as a Web Resources folder) that identify resources that are to be accessible via HTTP(s) requests to a web server. Each project may comprise one or more web form pages (aspx pages) that serve as the user interface for a portal snippet. One or mode core module may be associated with each aspx page. The code modules implement the user interface and content (e.g., specify the set of queries to be executed when the portal snippet is invoked) characteristics of a portal snippet. According to an embodiment of the present invention, these code module objects inherit from a class that derives from SAP-.Portal.Web.PortalComponent class.

Figure 7:
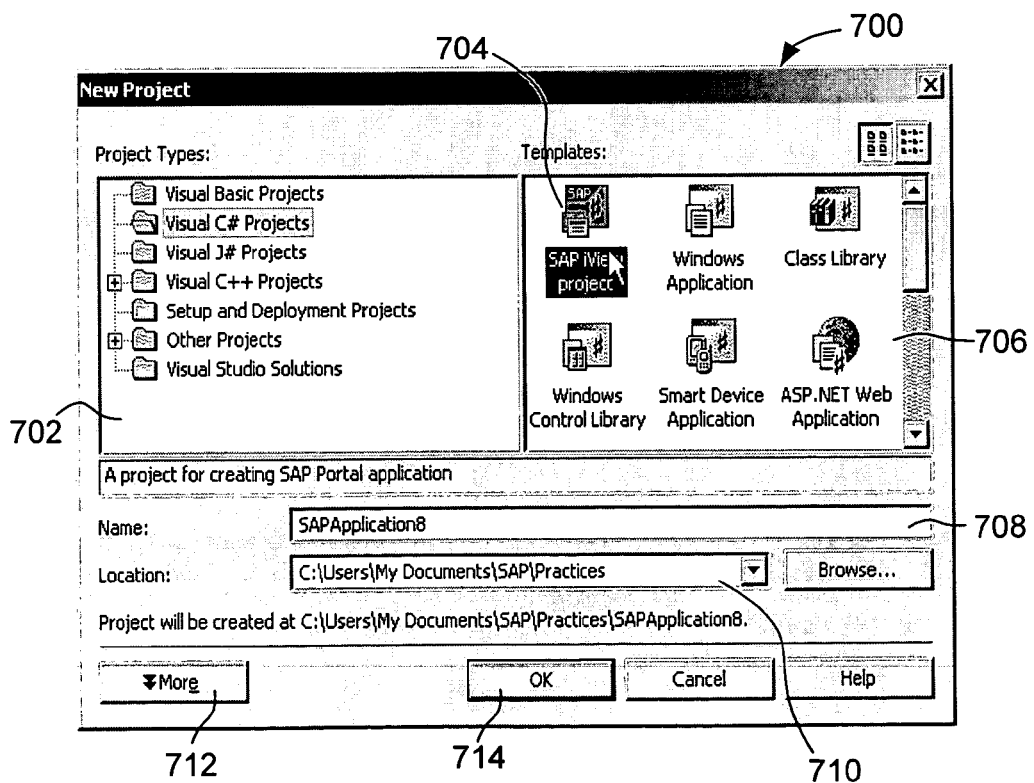
FIG. 7 depicts a graphical user interface that is invoked as part of opening a new project according to an embodiment of the present invention.

A project for the portal snippet may also be created using "File" menu option 410 depicted in FIG. 4. The user can create a new project by selecting "File" menu 410, then selecting sub-menu item "New" and then sub-menu item "Project". A graphical user interface 700, as depicted in FIG. 7, is displayed upon performing such a selection. Graphical user interface 700 enables the user to select a programming language for the project from window 702. The user may select a SAP iView project template 704 from window 706. The user may also provide information specifying the name of the project (in field 708) and information identifying the location where the project information is to be stored (in field 710). Other properties of the project may be specified using "More" button 712. After the user has specified the requisite information, a SAP project (or SAP Portal Archive) is created upon selecting "OK" button 714.

The actions described above may also be performed using a SAP toolbar and/or other toolbar. The actions may also be performed using one or more tabs 406 (e.g., upon selecting a "Start Page" tab and then a "New Project" option).

Figure 8:
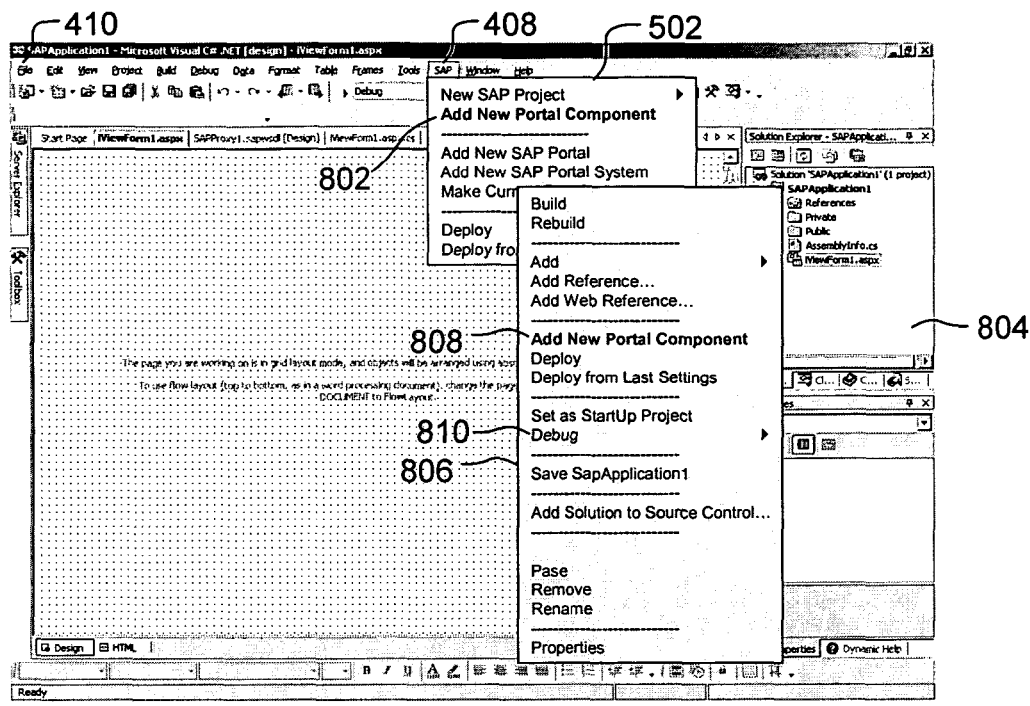
FIG. 8 depicts user-selectable options for adding a new portal component according to an embodiment of the present invention.

After a project has been created, the user may add a new portal component or portal snippet to the project. This step involves developing the portal snippet. Graphical user interface 400 provides various user-selectable options for adding a new portal component. According to one technique, the user may add a portal component by selecting SAP menu 408 and then selecting "Add New Portal Component" option 802 from menu 502 as depicted in FIG. 8. According to another technique, the user may add a portal component by invoking menu 806 by right clicking on a SAP project entry in Solution Explorer window 804, and then selecting "Add New Portal Component" option 808. The operations may also be performed using an SAP toolbar.

Figure 9:
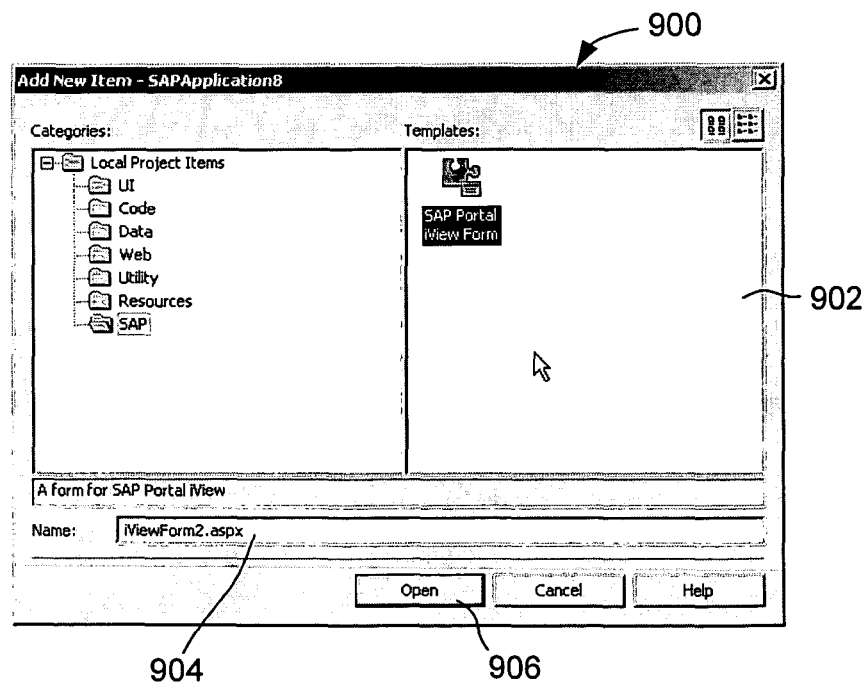
FIG. 9 depicts a graphical user interface that is invoked for adding a new item according to an embodiment of the present invention.

According to another technique, the user or designer may add a portal component by selecting File menu 410 and then selecting "Add New Item" option. According to an embodiment of the present invention, graphical user interface 900 depicted in FIG. 9 is displayed upon selecting File menu 410 and then selecting "Add New Item" option. The user may select a template to be used (from window 902) and specify a name for the selected template (in field 904) using graphical user interface 900. According to an embodiment of the present invention, a template provides the basic code for a Portal Component. Multiple templates may be provided for the various portal components. For example, a template may be provided for connecting to SAP systems, another may be provided for connecting to a SQL database, another may be provided that includes basic controls for implementing a search form, etc. A new portal component or portal snippet is then added to the project and opened upon selecting "Open" button 906.

Figure 10:
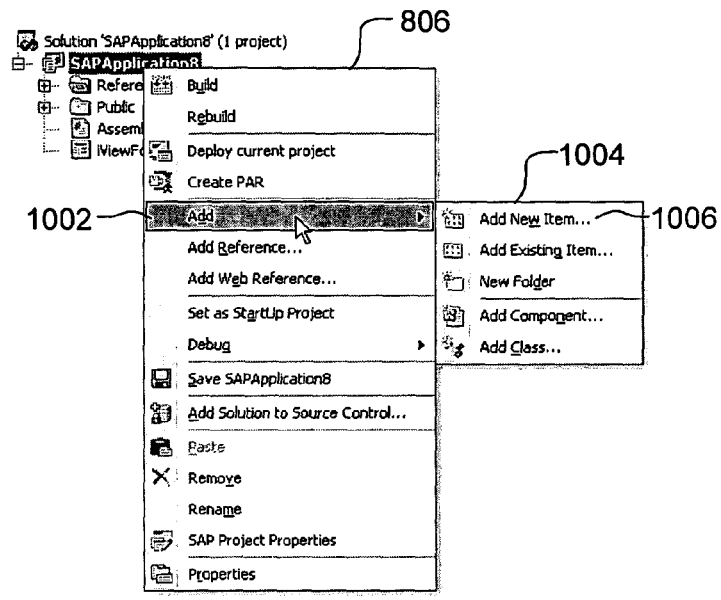
FIG. 10 depicts menus that are invoked for adding a new item according to an embodiment of the present invention.

According to another technique, as depicted in FIG. 10, a user may add a new portal component by selecting the SAP project entry in the Solution Explorer window, invoking menu 806 by right clicking the mouse, selecting "Add" option 1002 from menu 806, and then selecting "Add New Item . . ." option 1004 from menu 1006. Graphical user interface 900 depicted in FIG. 9 is then displayed which enables the user to select and name a template to be used for the portal component or portal snippet.

According to an embodiment of the present invention, a web form page (e.g., aspx file) is opened for a portal snippet. The web form page serves as the user interface for a portal snippet. One or more code modules may be associated with each web form page. The code modules implement the user interface and content (e.g., specify the set of queries to be executed when the portal snippet is invoked) characteristics of a portal snippet. According to an embodiment of the present invention, these code module objects inherit from a class that derives from SAP.Portal.Web.PortalComponent class.

According to an embodiment of the present invention, a sample code template is provided for the user upon adding a new portal component. The user may then modify the code template per the user's requirements. A sample code template may include sample code or code that may be used by a developer to speed-up the development process. For example, the code samples may be provided for common tasks such as connecting to a SAP system, connecting to a SQL database, code implementing controls for a search form, etc.

According to an embodiment of the present invention, the code that is associated with an aspx page is in a .NET supported language (e.g., the C## programming language, the VB.NET programming language, etc.) selected by the user for the project. Embodiments of the present invention thus enable portal snippets to be developed for Java-based portals (e.g., SAP portals) using a .NET language. This enables NET developers to develop content for Java-based framework portals. According to an embodiment of the present invention, the services provided by the Java framework-based portal that are implemented in Java language are exposed through a .NET type API that can be used by portal snippet programmers. For example, in one embodiment, .NET framework compatible API wrappers are provided for the Java language APIs. This enables .NET programmers who are not well-versed with Java programming to be able to develop content and applications for Java-framework-based portals. Accordingly, embodiments of the present invention enable portal snippets to be developed for a portals based upon a particular framework using a language that is supported by a framework that is different from the particular framework.

The HTML created for an aspx page according to an embodiment of the present invention is shown below. The HTML shown below is shown merely as an example is not intended to limit the scope of the present invention.

```
<%@ Page language="c#" Codebehind="PortalComponent2.aspx.cs"
AutoEventWireup="false"
Inherits="PortalArchive1.PortalComponent2" %>
<%@ Register TagPrefix="sap" Namespace="SAP.Web.UI.Controls"
Assembly="SAP.Web, Version=1.0.0.0,
Culture=neutral, PublicKeyToken=e157d5794cced2e5" %>
<!DOCTYPE HTML PUBLIC "-//W3C//DTD HTML 4.0
Transitional//EN" >
<HTML>
    <HEAD>
        <meta name="GENERATOR" Content="Microsoft Visual
        Studio .NET 7.1">
        <meta name="CODE_LANGUAGE" Content="C#">
        <meta name="vs_defaultClientScript"
        content="JavaScript">
        <meta name="vs_targetSchema"
        content="http://schemas.microsoft.com/intellisense/ie5">
        <LINK href="C:\Program Files\SAP\SAP .NET
        Portal Development Kit
1.0\Controls\ur\ur_design.css"
            type="text/css" rel="stylesheet">
        <!--Content placed outside this form tag
        will be ignored.-->
    </HEAD>
    <body class="prtlBody">
        <form id="MyPortalComponent" method="post"
        runat="server">
            <P>
                <sap:Button id="Button1" runat="server"
                Text="Button"
Design="EMPHASIZED"></sap:Button>
                <sap:CheckBox id="CheckBox1" runat="server"
                Text="CheckBox"></sap:CheckBox>
                <sap:Label id="Label1" runat="server"
                Text="Label"></sap:Label>
                <sap:TextEdit id="TextEdit1"
                runat="server"></sap:TextEdit>
                <sap:InputField id="InputField1" runat="server"
                ReadOnly="True"></sap:InputField></P>
            <P>
                <sap:Table id="Table1" runat="server"
```

-continued

```
            Design="ALTERNATING">
                <sap:Caption Text="Table"
                ID="caption1"></sap:Caption>
            </sap:Table></P>
        </form>
    </body>
</HTML>
```

Sample code that may be associated with an aspx page according to an embodiment of the present invention is provided below. The user may then modify the code template per the user's requirements. The sample code shown below is shown merely as an example is not intended to limit the scope of the present invention.

```
using System;
using System.Collections;
using System.ComponentModel;
using System.Data;
using System.Drawing;
using System.Web;
using System.Web.UI;
using SAP.Portal.Web.UI;
using SAP.UI;
using SAP.Web.UI.Controls;
namespace MyPortalArchive
{
    /// <summary>
    /// Summary description for PortalComponent1.
    /// </summary>
    [PortalComponentAttribute("MyPortalComponent","MyPortalComponent.aspx")]
    public class MyPortalComponent : SAP.Portal.Web.UI.PortalComponent
    {
        private void Page_Load(object sender, System.EventArgs e)
        {
            Response.Write("Hello World");
        }
        #region Web Form Designer generated code
        override protected void OnInit(EventArgs e)
        {
            //
            // CODEGEN: This call is required by the ASP.NET Web Form Designer.
            //
            InitializeComponent( );
            base.OnInit(e);
        }
        /// <summary>
        /// Required method for Designer support - do not modify
        /// the contents of this method with the code editor.
        /// </summary>
        private void InitializeComponent( )
        {
            this.Load += new System.EventHandler(this.Page_Load);
        }
        #endregion
    }
}
```

Figure 11:
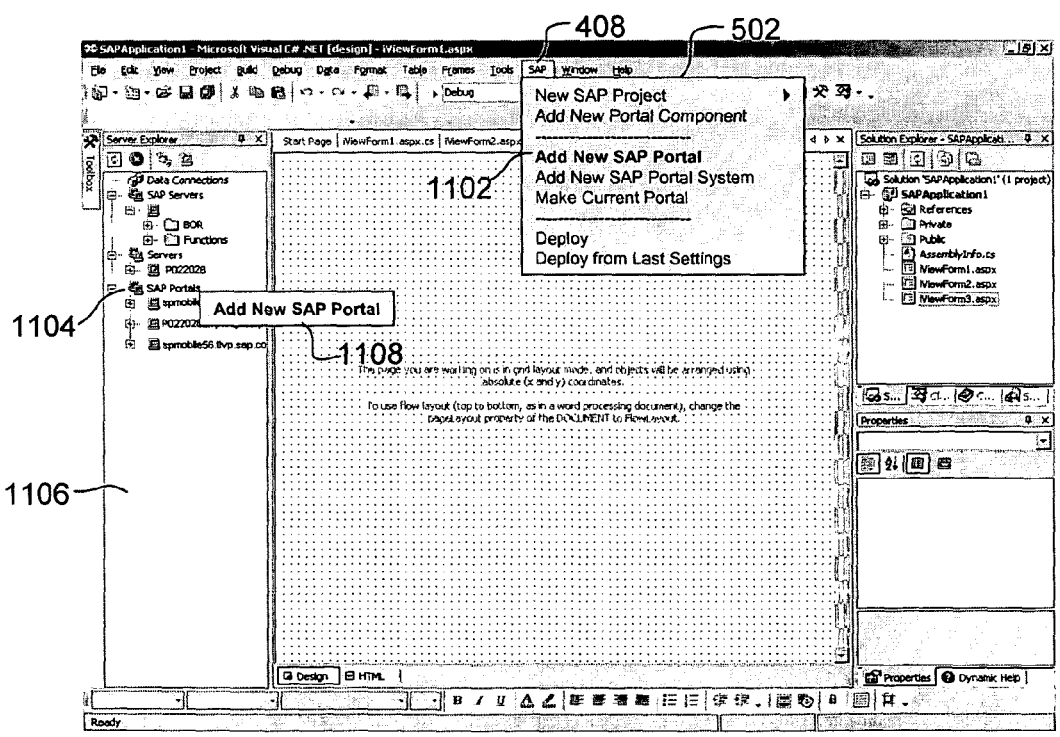
FIG. 11 depicts user-selectable options for adding a new portal according to an embodiment of the present invention.

Graphical user interface 400 provides various user-selectable options for adding a new portal to which the portal snippet is to be deployed. According to one technique, the user or designer may add a portal by selecting SAP menu 408 and then selecting "Add New SAP Portal" option 1102 from menu 502 as depicted in FIG. 11. According to another technique, the user may add a portal by invoking menu 1104 by right clicking on a SAP Portal root folder entry 1104 in Server Explorer window 1106, and then selecting "Add New SAP Portal" option 1108. The operations may also be performed using an SAP toolbar.

Figure 12:
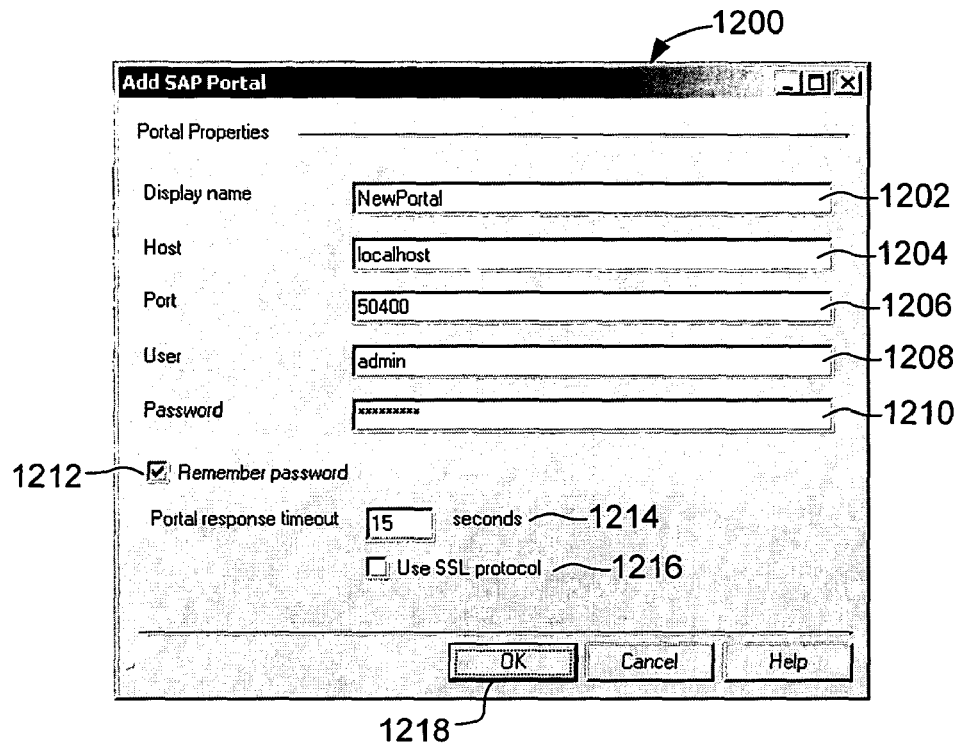
FIG. 12 depicts a graphical user interface that enables addition of a SAP portal according to an embodiment of the present invention.

According to an embodiment of the present invention, upon selecting a "Add New SAP Portal" option, graphical user interface 1200 as depicted in FIG. 12 is invoked. Graphical user interface 1200 comprises various input fields for entering values for properties of the portal to be added. For example, as depicted in FIG. 12, the user may input a value for a name 1202 for the portal instance that will be displayed for the portal. The portal may be specified by providing a portal host name 1204 for the portal and a portal port number 1206. The user may also specify a user role/name indicator 1208 and a password 1210 for accessing the portal. Graphical user interface 1200 provides an option 1212 which when checked indicates that the password entered in 1210 is to be remembered across sessions of the IDE. The user may input a portal response timeout parameter 1214. This parameter identifies the timeout value (e.g., in seconds) for requests from the IDE to the portal server. The user can also specify whether or not to use a secure protocol (e.g., SSL, https) using option 1216.

Figure 13:
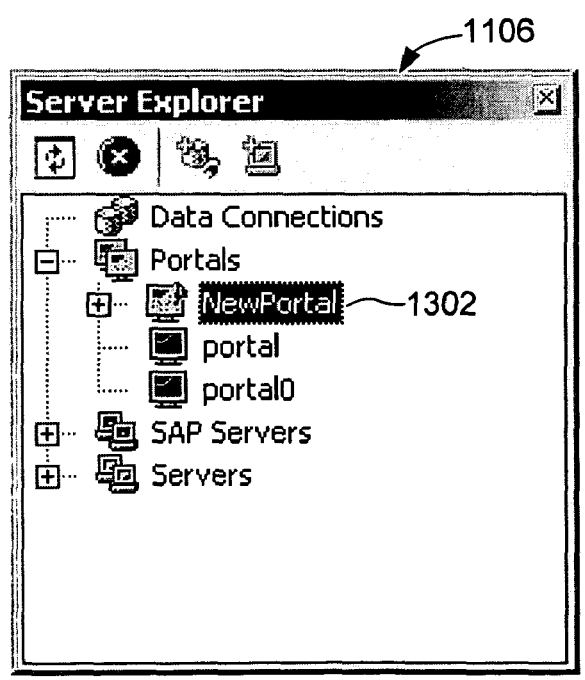
FIG. 13 depicts a graphical user interface displaying addition of a new portal instance according to an embodiment of the present invention.
Figure 14:
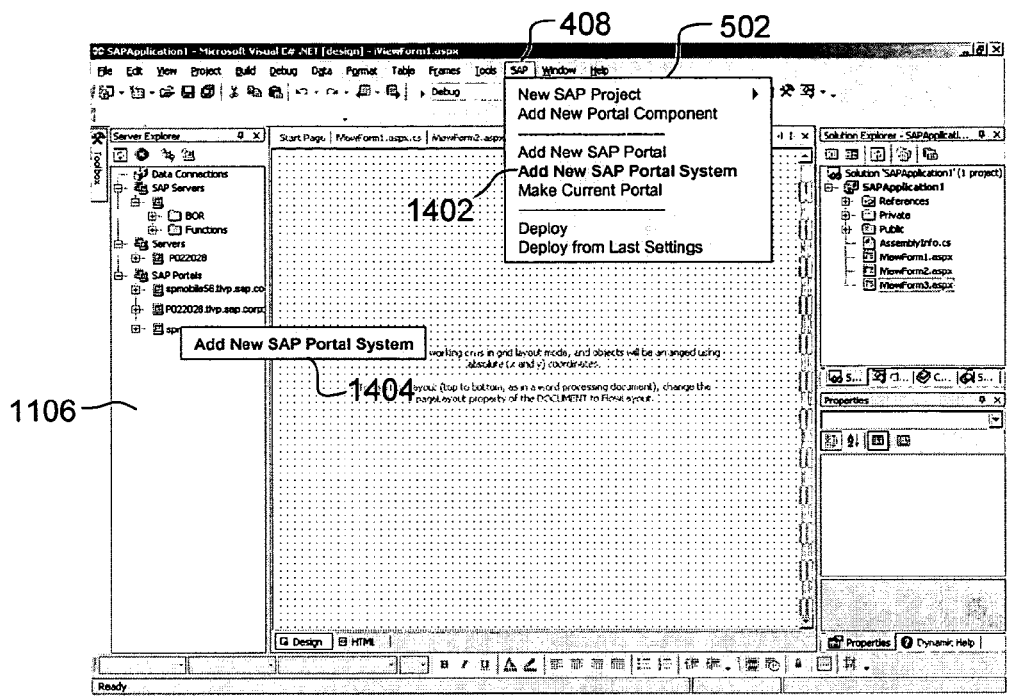
FIG. 14 depicts user-selectable options for adding a new SAP portal system according to an embodiment of the present invention.

After the requisite information has been entered into graphical user interface 1200, a portal instance is added for the portal by selecting "OK" button 1218. As depicted in FIG. 13, a new portal instance 1302 labeled "NewPortal" is added to the display under the Portals node in Server Explorer window 1106. The user may perform multiple operations on a portal using the portal instance displayed in window 1106. For example, the user may select a portal instance from window 1106 and mark it as the "current" portal. Portal snippets are deployed to the current portal. Properties of a portal instance may also be changed. According to an embodiment of the present invention, connectivity status information is displayed for each portal instance displayed in window 1106. The connectivity status information for a portal instance visually indicates whether the portal corresponding to the portal instance is connected or disconnected to a computer system executing the IDE. A portal is deemed connected to the computer system if the computer system can send information to the portal and receive information from the portal. In certain embodiments, a timeout connectivity parameter may be specified. In such embodiments, a portal is deemed connected to computer system 102 if computer system 102 can receive a response from the portal within the timeout threshold time limit. Accordingly, in such embodiments, a portal is deemed disconnected if the response from the portal is not received within the timeout threshold limit, even though the response might be received from the portal. In other embodiments, a portal node is deemed disconnected even if it can send and receive information from a portal but the authentication attempt fails. For further information on display of portals information and operations that may be performed using portal instances, please refer to U.S. patent application Ser. No. 10/851,462 entitled "DISPLAYING PORTALS INFORIVI-ATION" filed concurrently with the present application An IDE configured according to the teachings of the present invention also provides several user-selectable options for adding a new SAP portal system. According to one technique, the user may add a new portal system by selecting a portal instance displayed in Server Explorer window 1106, selecting SAP menu 408, and then selecting "Add New SAP Portal System" option 1402 from menu 502, as depicted in FIG. 14. According to another technique, the user may add a portal system by selecting a portal instance displayed in Server Explorer window 1106 and then selecting "Add New SAP Portal System" option 1404 that is invoked upon right-clicking the mouse. The operations may also be performed using an SAP toolbar.

Figure 15:
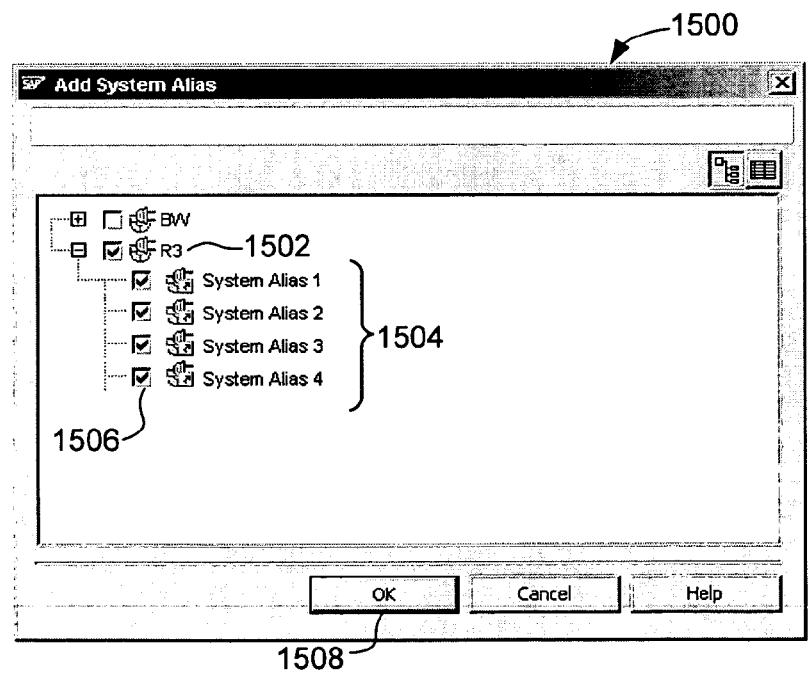
FIG. 15 depicts a graphical user interface displaying systems for a portal instance in a tree view format according to an embodiment of the present invention.
Figure 16:
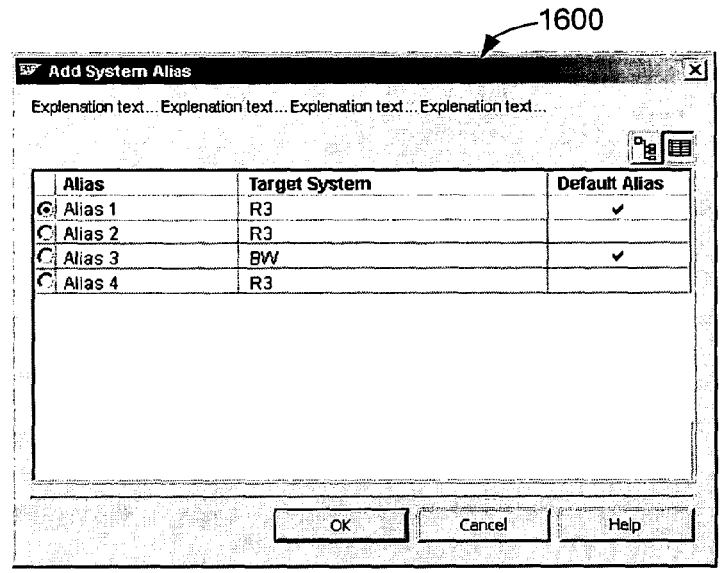
FIG. 16 depicts a graphical user interface displaying systems for a portal instance in a list view format according to an embodiment of the present invention.

According to an embodiment of the present invention, upon selecting a "Add New SAP Portal System" option, a graphical user interface 1500 as depicted in FIG. 15 is invoked. Graphical user interface 1500 displays various systems 1504 that are associated with a portal instance 1502 and provides the user the ability to add one or more of the displayed systems. For example, as depicted in FIG. 15, the user may add a portal system by checking a checkbox 1506 corresponding to the portal system to be added. The checked systems are then added upon selecting "OK" button 1508. Graphical user interface 1500 depicted in FIG. 15 displays the information in a tree view format. Graphical user interface 1600 depicted in FIG. 16 displays the information in a list view format.

Figure 17:
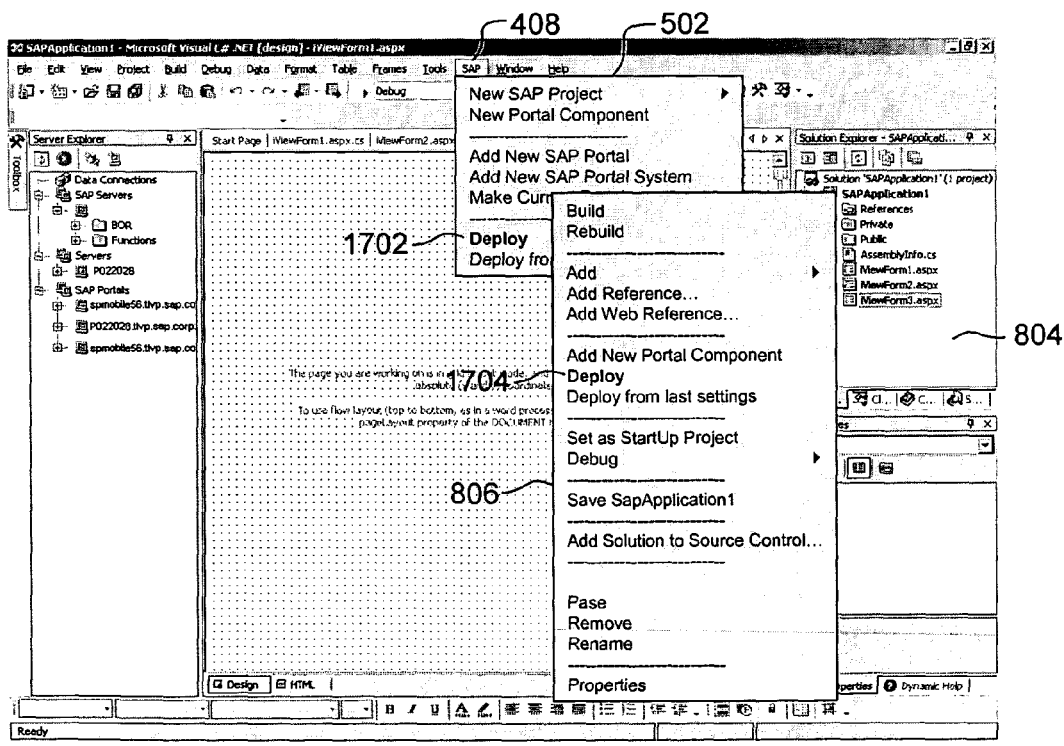
FIG. 17 depicts user-selectable options for deploying a portal snippet according to an embodiment of the present invention.

An IDE configured according to the teachings of the present invention also provides several user-selectable options for deploying a portal snippet to a SAP portal. During deployment, files related to a project including the portal snippet are packaged as a portal archive (PAR) and the PAR is then communicated to the portal for subsequent use. According to one technique, the user or designer may deploy a portal component or portal snippet by selecting a portal project and then selecting "Deploy" option 1702 from menu 502, as depicted in FIG. 17. Alternatively, the user may select a project in Solution Explorer window 804, invoke menu 806 by right clicking the mouse, and then select "Deploy" option 1704 from menu 806. The deployment operations may also be performed using an SAP toolbar.

Figure 18:
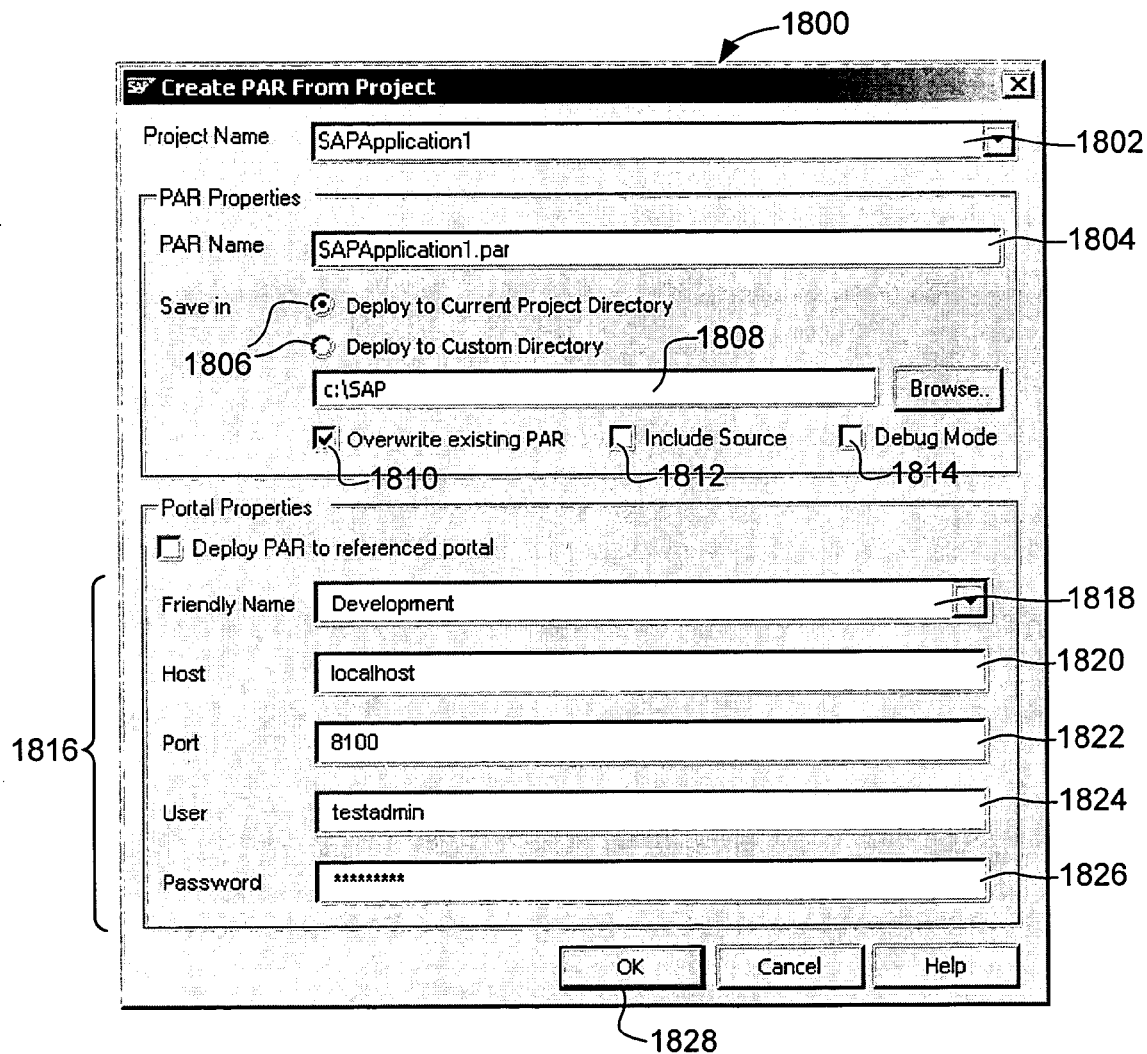
FIG. 18 depicts a graphical user interface for creating a PAR according to an embodiment of the present invention.

According to an embodiment of the present invention, as part of the deployment process, a portal archive (PAR) is created and then deployed to the portal. FIG. 18 depicts a graphical user interface 1800 for creating a PAR according to an embodiment of the present invention. As depicted in FIG. 1800, the user can identify the project for which a PAR is to be created in field 1802. A name for the PAR may be specified in field 1804. The user can specify whether the PAR is to be saved in the current project directory or a custom directory by selecting an appropriate option 1806. The custom directory, if selected, may be specified in field 1808. The user may use option 1810 to specify whether the PAR to be created is to overwrite an existing PAR. The user may also specify the files to be included in a PAR. The user may use option 1812 to specify whether source files are to be included in the PAR. The user may select option 1814 to indicate whether or not debug files and symbols are to be included in the PAR.

Information identifying the portal to which the PAR is to be deployed may be specified in section 1816 of graphical user interface 1800. The user may specify the name 1818 of the portal instance corresponding to the portal, host 1820 of the portal, port number 1822 for the portal, user access role 1824, and password 1826 for the portal. Selection of "OK" button 1828 creates a PAR per the user-specified information.

Figure 19:
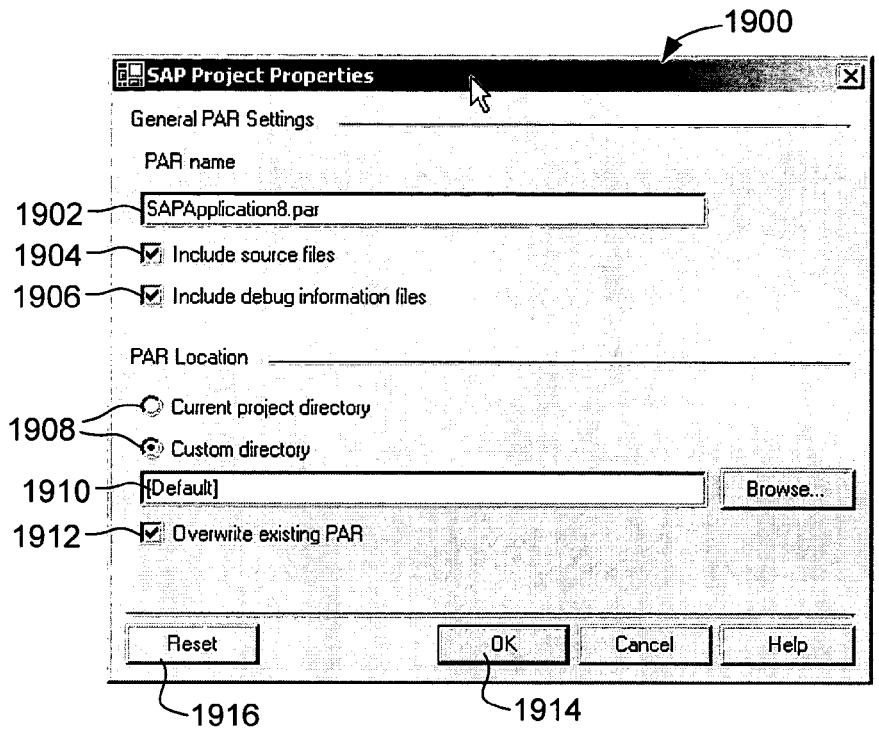
FIG. 19 depicts a graphical user interface for setting project properties according to an embodiment of the present invention.

Properties set for a project may also influence the manner in which a PAR is created. FIG. 19 depicts a graphical user interface 1900 that may be used for setting properties for a project that affect (or are used for) PAR creation according to an embodiment of the present invention. As depicted in FIG. 19, a plurality of project properties and their values are displayed. The user may set/change the property values to suit the user's needs. For example, the user may specify the name of the PAR in field 1902. A user may specify if source files and debug files/symbols are to be included in the PAR by selecting options 1904 and 1906 respectively. The user can specify whether the PAR is to be saved in the current project directory or a custom directory by selecting an appropriate option 1908. The custom directory, if selected, may be specified in field 1910. The user may use option 1912 to specify whether the PAR to be created is to overwrite an existing PAR. Selection of "OK" button 1914 sets the user-specified values for the project properties. Selection of "Reset" button 196 resets the values of the displayed properties to their default options.

As part of the deployment process for a project, all relevant files for the project are copied from the project storage location to a temporary directory and a PAR is created based upon the files. The relevant files may include source files, debug files, etc. Properties associated with the project and other user-specified configurations may be used to determine the relevant files to be included in a PAR.

According to an embodiment of the present invention, an XML file (e.g., a PortalApp.xml file) is also automatically created as part of the deployment process. The XML file holds the configurable properties for a project and a portal snippet that is being deployed. According to an embodiment of the present invention, the XML describes the portal components that are in the PAR (it is a part of the output of the project and not the project itself).

The PAR (from the specified location) is then deployed to the specified portal. For example, the PAR may be deployed to a Java-based portal such as a SAP AG enterprise portal server. According to an embodiment of the present invention, HTTP protocol is used to communicate with the portal. For example, an HTTPWebRequest is use to communicate with the portal and the binary PAR file is sent on the request stream. The XML file may also be communicated to the portal as part of the PAR. Other communication protocols may also be used in alternative embodiments.

Figure 20:
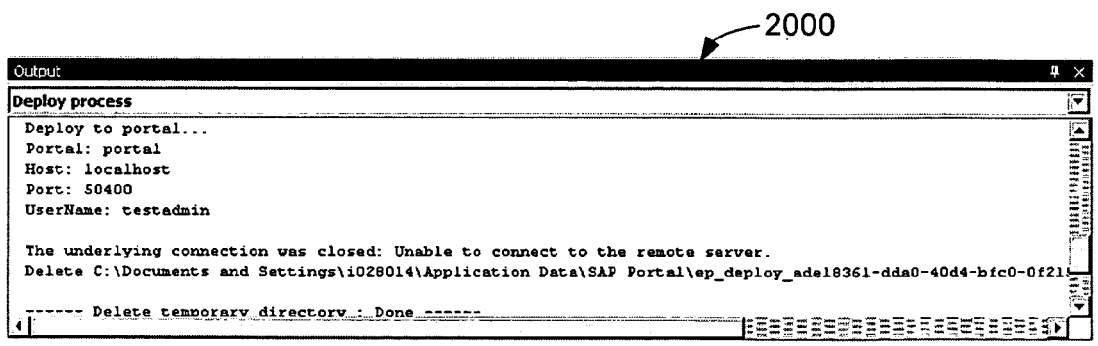
FIG. 20 depicts a status window that outputs deployment status information according to an embodiment of the present invention.

According to an embodiment of the present invention, the status of the deployment process may be output to the user. FIG. 20 depicts a status window 2000 that outputs deployment status information according to an embodiment of the present invention. As depicted in FIG. 20, the status window may display details of the portal to which the PAR is deployed, status information of the deployment process, and other deployment-related information.

An IDE configured according to the teachings of the present invention also provides user-selectable options for debugging and launching a portal component. According to an embodiment of the present invention, standard .NET debugging techniques may be used to debug portal snippets developed for a Java-based framework such as J2EE. As depicted in FIG. 8, a "Debug" option 810 is provided that a user may select fro debugging a portal component such as an SAP iView. The IDE also provides user-selectable options that enable a user to launch a portal component and preview it without having to launch the whole portal to which the portal component is deployed. For example, a "View in Browser" menu item may be provided in the project context menu.

As described above, embodiments of the present invention extend the capabilities of an IDE by providing user-selectable options that enable a user to use the IDE to develop applications for a first framework (e.g., .NET) and to develop portal snippets for a portal based upon a second framework such as a Java-based framework (e.g., J2EE). The portal snippets may be developed using a language supported by the first framework. For example, .NET developers may use an IDE configured according to the teachings of the present invention to develop not only .NET applications but also to develop portal snippets (e.g., SAP iViews) for a Java-based portal such as a SAP AG enterprise portal. The portal snippet may be programmed using a .NET language instead of Java language. This enables .NET developers to create content for SAP portals. According to the teachings of the present invention, user-selectable options provided by the IDE may also be used to deploy portal snippets to portals. Embodiments of the present invention thus facilitate creation and deployment of portal snippets to portals.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of enabling development of portal snippets using an integrated development environment (IDE), the IDE comprising user-selectable options for developing an application for a first framework associated with a first programming language, a first application programming interface (API), and a first debugger, the method comprising:

providing, via the IDE, a first set of user-selectable options for developing a portal snippet for a portal based upon a second framework, different from the first framework and associated with a second programming language different from the first programming language, second API different from the first API, and a second debugger different from the first debugger, wherein said developing comprises a user creating the portal snippet with the first programming language and wherein at least one portal service provided by the portal in connection with the portal snippet is exposed through the first API;

providing, via the IDE, a second set of user-selectable options for deploying the portal snippet to the portal, wherein said deploying the portal snippet comprises communicating source files to a portal server associated with the portal and a user-selectable option of communicating debug files to the portal server associated with the portal; and providing, via the IDE, a third set of user-selectable options for debugging the portal snippet after the portal snippet has been deployed to the portal, wherein said debugging comprises the user debugging the deployed portal snippet, at the portal server using the debug files received from the IDE, with the first debugger.

2. The method of claim 1 wherein the first framework is .NET and the second framework is a Java-based framework, and the portal service is exposed via portal wrappers, compatible with the first API, for the second API.

3. The method of claim 2 wherein the second framework is Java 2 Platform, Enterprise Edition (J2EE) framework.

4. The method of claim 1 wherein the first framework is .NET, the second framework is a Java-based framework, and the first programming language is a language selected from a group of languages comprising C# and Visual Basic.

5. The method of claim 1 wherein the first set of user-selectable options comprises at least one user-selectable option for creating a project and at least one user-selectable option for adding a portal snippet to the project.

6. The method of claim 1 wherein the second set of user-selectable options comprises at least one user-selectable option for specifying the portal to which the portal snippet is to be deployed.

7. The method of claim 1 wherein the second set of user-selectable options comprises at least one user-selectable option for creating a portal archive for the portal snippet to be deployed.

8. The method of claim 1 wherein the second set of user-selectable options comprises at least one user-selectable option for launching the portal snippet.

9. A method of developing a portal snippet using an integrated development environment (IDE) executing on a computer system, the IDE comprising a plurality user-selectable options, the plurality of user-selectable options including a set of user -selectable options for developing an application for a first framework, wherein the first framework is associated with a first programming language, a first application programming interface (API), and a first debugger, the method comprising:

developing a portal snippet for a portal using at least one user-selectable option from the plurality of user-selectable options, wherein the portal is configured to operate based upon a second framework, different from the first framework and associated with a second programming language different form the first programming language, a second API different from the first API, and a second debugger different from the first debugger, wherein said developing comprises a user creating the portal snippet with the first programming language and wherein at least one portal service provided by the portal in connection with the portal snippet is exposed through the first API;

deploying the portal snippet to the portal using at least one user-selectable option from the plurality of user-selectable options, wherein said deploying the portal snippet comprises communicating source files to a portal server associated with the portal and a user-selectable option of communicating debug files to the portal server associated with the portal; and debugging the portal snippet after the portal snippet has been deployed to the portal, wherein said debugging comprises the user debugging the deployed portal snippet, at the portal server using the received debug files, with the first debugger.

10. The method of claim 9 wherein the first framework is .NET and the second framework is a Java-based framework.

11. The method of claim 9 wherein:
the first framework is .NET;
the second framework is a Java-based framework; and
the first programming language is selected from a group of languages comprising C# and Visual Basic.

12. The method of claim 9 wherein deploying the portal snippet comprises:
receiving information identifying the portal to which the portal snippet is to be deployed;
generating a portal archive for the portal snippet to be deployed; and
communicating the portal archive to the portal.

13. A computer program product stored on a computer-readable medium for enabling development of portal snippets using an integrated development environment (IDE), the IDE comprising user-selectable options for developing an application for a first framework associated with a first programming language, a first application programming interface (API), and a first debugger, the computer program product comprising:

code for providing, via the IDE, a first set of user-selectable options for developing a portal snippet for a portal based upon a second framework, different from the first framework and associated with a second programming language different from the first programming language, a second API different from the first API, and a second debugger different from the first debugger, wherein said developing comprises a user creating the portal snippet with the first programming language and wherein at least one portal service provided by the portal in connection with the portal snippet is exposed through the first API;

code for providing, via the IDE, a second set of user-selectable options for deploying the portal snippet to the portal, wherein said deploying the portal snippet comprises communicating source files to a portal server associated with the portal and a user-selectable option of communicating debug files to the portal server associated with the portal; and code for providing, via the IDE, a third set of user-selectable options for debugging the portal snippet after the portal snippet has been deployed to the portal, wherein said debugging comprises the user debugging the deployed portal snippet, using the debug files communicated from the IDE, with the first debugger.

14. The computer program product of claim 13 wherein the first framework is .NET and the second framework is a Java-based framework, and the portal service is exposed via portal wrappers, compatible with the first API, for the second API.

15. The computer program product of claim 14 wherein the second framework is Java 2 Platform, Enterprise Edition (J2EE) framework.

16. The computer program product of claim 13 wherein the first framework is .NET, the second framework is a Java-based framework, and the first programming language is a language selected from a group of languages comprising C# and Visual Basic.

17. The computer program product of claim 13 wherein the second set of user-selectable options comprises at least one user-selectable option for specifying the portal to which the portal snippet is to be deployed.

18. The computer program product of claim 13 wherein the second set of user-selectable options comprises at least one user-selectable option for creating a portal archive for the portal snippet to be deployed.

19. The computer program product of claim 13 wherein said deploying the portal snippet comprises communicating source files and debug files to a portal server associated with the portal.

20. The computer program product of claim 13 wherein the second set of user-selectable options comprises at least one user-selectable option for launching the portal snippet.

21. A computer program product stored on a computer-readable medium for developing a portal snippet using an integrated development environment (IDE) executing on a computer system, the IDE comprising a plurality user-selectable options, the plurality of user-selectable options including a set of user-selectable options for developing an application for a first framework, wherein the first framework is associated with a first programming language, a first application programming language interface (API), and a first debugger, the computer program product comprising:

code for developing a portal snippet for a portal using at least one user-selectable option from the plurality of user-selectable options, wherein the portal is configured to operate based upon a second framework, different from the first framework and associated with a second programming language different form the first programming language, a second API different from the first API, and a second debugger different from the first debugger, wherein said developing comprises a user creating the portal snippet with the first programming language and wherein at least one portal service provided by the portal in connection with the portal snippet is exposed through the first API;

code for deploying the portal snippet to the portal using at least one user-selectable option from the plurality of user-selectable options, wherein said deploying the portal snippet comprises communicating source files to a portal server associated with the portal and a user-selectable option of communicating debug files to the portal server associated with the portal; and code for debugging the portal snippet after the portal snippet has been deployed to the portal, wherein said debugging comprises the user debugging the deployed portal snippet at the portal server, with the first debugger.

22. The computer program product of claim 21 wherein the first framework is .NET and the second framework is a Java-based framework, and the portal service is exposed via portal wrappers, compatible with the first API, for the second API.

23. The computer program product of claim 21 wherein:
the first framework is .NET;
the second framework is a Java-based framework; and
the first programming language is selected from a group of languages comprising C# and Visual Basic.

24. The computer program product of claim 21 wherein the code for deploying the portal snippet comprises:
code for receiving information identifying the portal to which the portal snippet is to be deployed;
code for generating a portal archive for the portal snippet to be deployed; and
code for communicating the portal archive to the portal.

25. A data processing system comprising:
a processor; and
a memory coupled to the processor, the memory configured to store a plurality of code modules for execution by the processor, wherein code modules from the plurality of code modules when executed by the processor cause the processor to execute a integrated development environment (IDE) comprising user-selectable options for developing an application for a first framework, associated with a first programming language, a first application programming interface (API), and a first debugger, the plurality of code modules comprising:
a code module for providing, via the IDE, a first set of user-selectable options for developing a portal snippet for a portal based upon a second framework, different from the first framework and associated with a second programming language different from the first programming language, a second API different from the first API, and a second debugger different from the first debugger, wherein said developing comprises a user creating the portal snippet with the first programming language and wherein at least one portal service provided by the portal in connection with the portal snippet is exposed through the first API;
a code module for providing, via the IDE, a second set of user-selectable options for deploying the portal snippet to the portal, wherein said deploying the portal snippet comprises communicating source files to a portal server associated with the portal and a user-selectable option of communicating debug files to the portal server associated with the portal; and
a code module for providing, via the IDE, a third set of user-selectable options for debugging the portal snippet after the portal snippet has been deployed to the portal, wherein said debugging comprises the user debugging the deployed portal snippet, using the debug files communicated from the IDE, with the first debugger.

26. The system of claim 25 wherein the first framework is .NET and the second framework is a Java-based framework, and the portal service is exposed via portal wrappers, compatible with the first API, for the second API.

27. The system of claim 25 wherein the second set of user-selectable options comprises at least one user-selectable option for specifying the portal to which the portal snippet is to be deployed, and at least one user-selectable option for creating a portal archive for the portal snippet to be deployed.

28. A data processing system comprising:
a processor; and
a memory coupled to the processor, the memory configured to store a plurality of code modules for execution by the processor, wherein code modules from the plurality of code modules when executed by the processor cause the processor to execute a integrated development environment (IDE) comprising a plurality user-selectable options including a set of user-selectable options for developing an application for a first framework, associated with a first programming language, a first application programming interface (API), and a first debugger, the plurality of code modules comprising:
a code module for developing a portal snippet for a portal using at least one user-selectable option from the plurality of user-selectable options, wherein the portal is configured to operate based upon a second framework, different from the first framework and associated with a second programming language different form the first programming language, a second API different from the first API, and a second debugger different from the first debugger, wherein said developing comprises a user creating the portal snippet with the first programming language and wherein at least one portal service provided by the portal in connection with the portal snippet is exposed through the first API;
a code module for deploying the portal snippet to the portal using at least one user-selectable option from the plurality of user-selectable options, wherein said deploying the portal snippet comprises communicating source files to a portal server associated with the portal and a user-selectable option of communicating debug files to the portal server associated with the portal; and
a code module for debugging the portal snippet after the portal snippet has been deployed to the portal, wherein said debugging comprises the user debugging the deployed portal snippet, at the portal server, with the first debugger.

29. The system of claim 28 wherein the first framework is .NET and the second framework is a Java-based framework, and the portal service is exposed via portal wrappers, compatible with the first API, for the second API.

* * * * *